INVENTOR.
WILLIAM W. BROCKWAY,
BY
ATTORNEY.

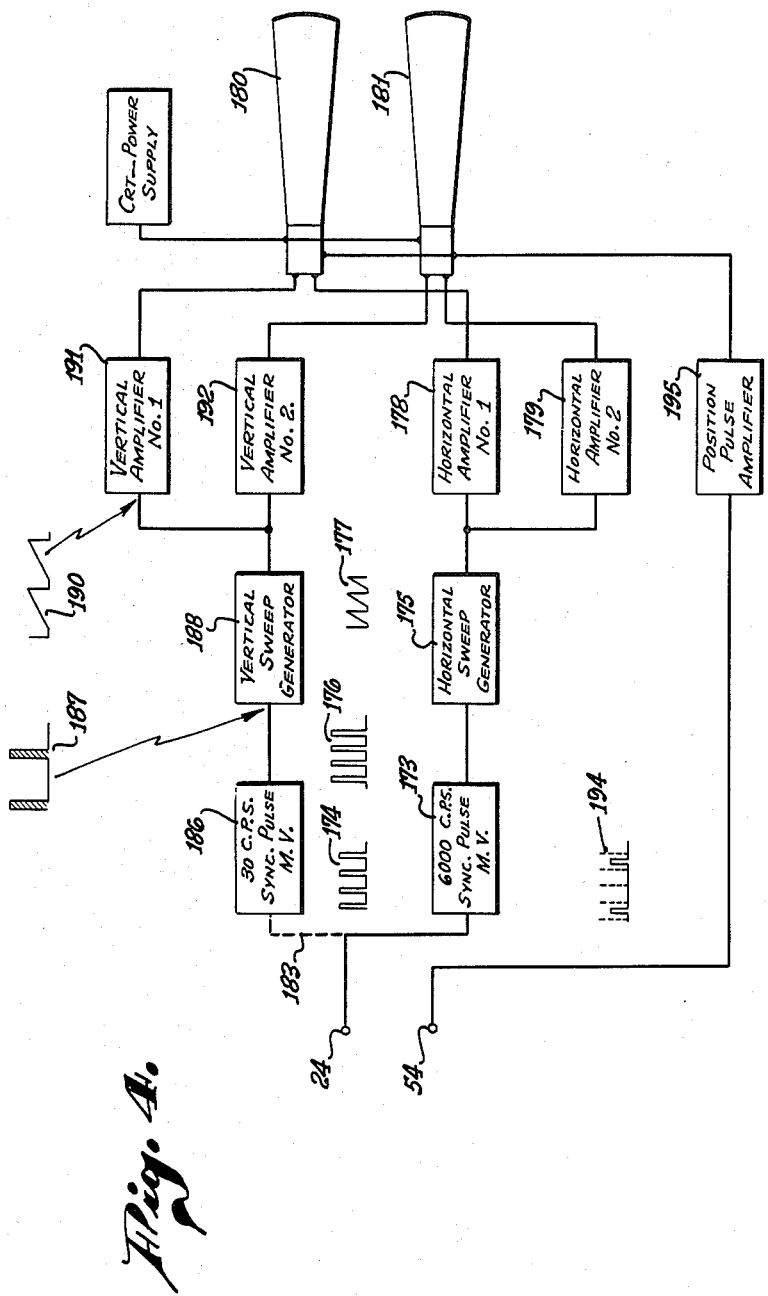

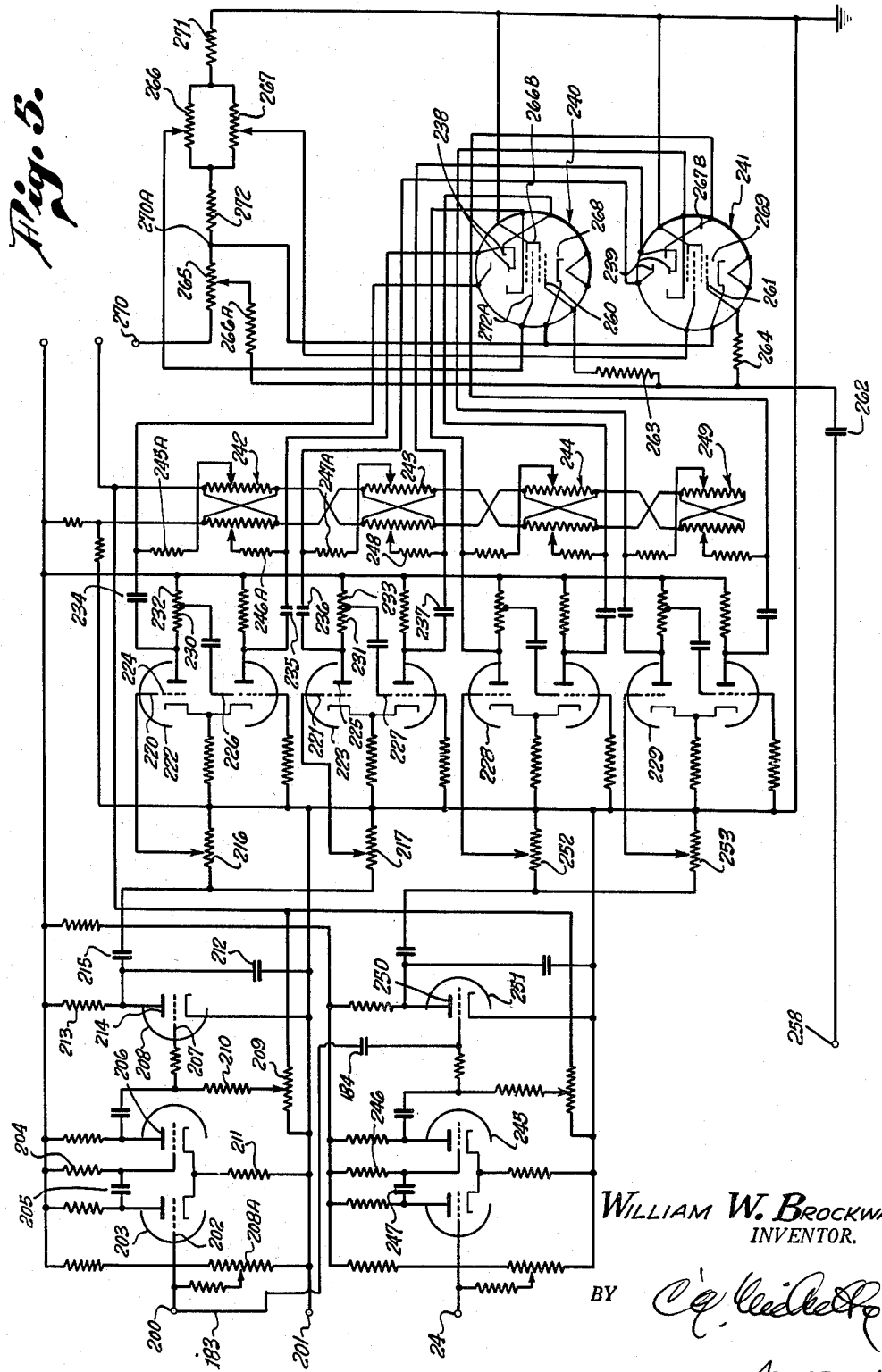

United States Patent Office 2,732,548
Patented Jan. 24, 1956

2,732,548

ELECTRONIC SYSTEM FOR CORRELATING PHASE-MODULATED SIGNALS

William W. Brockway, Los Angeles, Calif.

Application March 20, 1950, Serial No. 150,683

9 Claims. (Cl. 343—101)

Generally speaking, the present invention relates to systems for correlating the phase of modulated signals, and more particularly to systems for correlating the phase of one or more groups of modulated signals, each group including two signals which are frequency and phase oriented in space in accordance with two different modulating frequencies and coordinates which it is desired to measure and to produce from said modulated signals a signal or a plurality of signals carrying intelligence as to the modulating frequencies and coordinates and which may be used to control an instrument such as a cathode-ray tube of the type customarily used in the television art, the vertical and horizontal sweep voltages of which are synchronized with reference signals whereby the coordinates to be measured with respect to a frame of reference will be visibly indicated on the cathode-ray tube screen. The cathode-ray tube screen may or may not be marked with Cartesian coordinate reference frame axes or any other desired frame of reference. It should also be noted that the centering of the cathode-ray tubes can be controlled at will by varying the sweep voltage potentials in any desired direction or directions, thus changing the center of the coordinates of the reference frame with respect to the screen of the tube.

The present invention may be employed wherever it is desired to ascertain the position of a point or plurality of points with respect to a frame of reference where two coordinates of the point correspond to two real variables. A point having coordinates corresponding to any two variables which can be made to control phase displacement of two signals can be visually reproduced on a cathode-ray tube screen through the use of the present invention, or a plurality of such points, each having coordinates corresponding to two real variables which control phase displacement of appropriate signals, may be produced upon a cathode-ray tube for simultaneous viewing thereof.

Generally speaking, the present invention comprises means for producing relatively long-duration gating pulses positioned in accordance with the phase of one modulated signal which is phase-displaced from a reference signal in accordance with a real variable or coordinate in one direction and also includes means for producing relatively short-duration pulses positioned in accordance with the phase of another modulated signal which is phase-displaced from a reference signal in accordance with another real variable or coordinate and which further includes electronic gating means for effectively selecting one of the short-duration pulses during each of the gating pulses to produce a signal carrying intelligence as to the coordinates which may be employed to control cathode-ray tube means wherein the sweep voltages in the directions corresponding to the two coordinates are synchronized with the corresponding reference signals, whereby a position corresponding to the two coordinates will be visibly indicated on the cathode-ray tube screen.

It should be noted that while the above general description refers to one point or position produced by two variables corresponding to the two coordinates of said position or point, a plurality of points or positions corresponding to a plurality of pairs of real variables or coordinates may be visually produced for simultaneous viewing.

It should also be noted that in the preferred form of the invention the relatively long-duration gating pulses produced are preferably, although not necessarily, of a relatively low frequency, such as is generally assigned to the image repetition or frame frequency in standard television practice, and that the relatively short-duration pulses produced are preferably, but not necessarily, of fairly high frequency, such as is customarily assigned for the image-line frequency in standard television practice. It should also be noted that in the preferred form of the present invention, in order to produce an image with equal horizontal and vertical definition and dimension, the period of each short-duration pulse preferably, though not necessarily, virtually corresponds to the frequency of the relatively long-duration gating pulses divided by the frequency of the high frequency squared, and that the period of each gating pulse preferably, although not necessarily, virtually corresponds to the reciprocal of the frequency of the high-frequency, short-duration pulses.

The specific form of the present invention, described and illustrated herein for exemplary purposes only, shows the present invention adapted for use in a Hertzian wave space-scanning aircraft blind landing system of the type more specifically and fully described, illustrated, and claimed in copending application of William W. Brockway and Douglas G. Shearer, Serial No. 150,681, filed concurrently herewith, now Patent No. 2,650,039, issued August 25, 1953, which discloses means, carried by an aircraft approaching a landing strip or airport, for producing in a selected space segment ahead of the aircraft a Hertzian wave pattern having characteristics differing at different points in said space segment in accordance with the angular coordinates of said points with respect to the origin of the Hertzian wave pattern which is disclosed as a transmitting antenna array carried by the approaching aircraft. In the system disclosed in said copending application, a plurality of Hertzian wave receiving antenna means are spacedly positioned around the airport or landing strip in a manner identifying selected points such as the boundaries of the airport or landing strip and any obstacles such as towers, hangars, buildings, and the like, and are arranged to receive the Hertzian wave pattern radiated from the approaching aircraft and direct each of the detected signals to a master correlating unit where a signal is produced carrying intelligence as to the angular coordinates of each of the receiver antenna means' locations with respect to the transmitting antenna array of the approaching aircraft, which signal is retransmitted to the approaching aircraft, and by cathode-ray tube means is transformed into a visibly observable image in true perspective from the attitude and position of the approaching aircraft of the various ground receiver locations identifying selected points around the airport. Thus the pilot of the approaching aircraft may observe the image produced on a cathode-ray tube of luminescent spots in the positions corresponding to the ground receiver antenna locations and may utilize same in landing the aircraft upon the landing strip in a manner simulating normal visual contact conditions with the ground, even though zero ceiling and zero visibility conditions actually prevail. The image seen by the pilot will appear similar to that actually directly observed by the pilot in landing an aircraft at night on an airport where selected boundaries of the landing strip are marked by beacon lights or other visible illumination.

This makes it possible for the pilot to land the aircraft while utilizing his sense of sight in a normal manner rather than the highly unnatural means of sensory perception normally used during blind landing with various prior art systems intended for landing an aircraft under bad visibility and ceiling conditions. Such prior art systems have generally employed instruments which require interpretation and correlation, or verbal directions from a ground control radar operator, or various other means employing unnatural perceptual methods which do not readily produce the desired concept in the mind of the pilot.

The complex Hertzian wave radiated into the selected space segment from the approaching aircraft as described and illustrated in said copending application is preferably produced by means of two groups of crossed loop antennae, one group consisting of two loop antennae crossed in mutually perpendicular planes and each energized with the same carrier frequency but modulated by the same modulating frequency 90° apart in electrical phase, thus producing a polarized Hertzian wave pattern component in the selected space segment modulated and phased in one direction in accordance with the angular coordinates in said direction of the reception point with respect to the crossed loop antennae group; and a second, similar antennae group oriented spatially 90° with respect to the first antennae group and comprising two mutually perpendicular crossed loop antennae energized by the same carrier frequency which is modulated with a different modulating frequency from that hereinabove mentioned which is 90° electrically phase-displaced in one of the crossed loop antennae with respect to the other, thus producing a polarized Hertzian wave pattern component in the selected segment modulated and phased in a direction perpendicular to the direction of phase-modulation produced in space by the first-mentioned antennae group or array, in accordance with the angular coordinates in said direction of the reception point with respect to the second crossed loop antennae group or array. Thus any point in the selected space segment ahead of the approaching aircraft will be filled with a complex Hertzian wave pattern having separable components corresponding to the two different mutually perpendicular coordinate directions, which are phase-displaced or modulated and phased in accordance with the angular coordinates in said directions with respect to the transmitting antennae carried by the approaching aircraft.

Thus the real variables in the specific form of the present invention, illustrated herein as used in an aircraft system of the type disclosed in said copending application, are angular deflections in two mutually perpendicular directions of a plurality of receiver antennae locations identifying selected points of an airport or landing strip with respect to a line parallel to the longitudinal axis of the aircraft and passing through the concentric transmitting scanning antenna means carried by the aircraft, and these angular deflections of each of the ground receiver antenna locations in each of the two mutually perpendicular directions are translated into corresponding phase displacements with respect to reference signals, these phase-displaced signals being received by the corresponding ground receivers and directed to a master control or correlating unit where the phase-displaced signals are correlated by the apparatus of the present invention so as to produce a signal carrying intelligence corresponding to the coordinates of the ground receiver antenna means' locations which may then be retransmitted to the approaching aircraft and employed to control cathode-ray tube means for producing a visual image in true perspective of the various ground receiver means, locations from the attitude and position of the approaching aircraft.

It should also be noted that, in the preferred form of the aircraft blind landing system specifically disclosed in said copending application and employing the present invention as the correlating unit therein, one of the synchronizing or reference signals hereinabove mentioned (which in the specific example described is the horizontal coordinate reference signal, and which is modulated with no phase displacement in accordance with the angular point of reception thereof) is also radiated from the approaching aircraft and is arranged to be received by one of the ground receivers and transmitted to the master control or correlating unit of the present invention. The purpose of this will be explained more fully hereinafter.

With the above points in mind, it is an object of the present invention to provide an improved system for correlating signals which are modulated and phase displaced from a standard reference signal or a plurality of standard reference signals in accordance with real variables or coordinates and to produce therefrom a signal carrying intelligence as to the variables or coordinates which is adapted to control cathode ray tube means synchronized with the reference signal or signals whereby a point or points corresponding to the coordinates will be visibly indicated with respect to a frame of reference.

A further object of the present invention is to provide improved means for controlling one phase-displaced signal by a second phase-displaced signal whereby the resultant signal carries intelligence convertible by cathode ray tube means into a visible point image positioned with respect to a frame of reference so as to have two coordinates corresponding respectively to the phase displacement of the two signals.

A further object of the present invention is to provide an improved system for converting space coordinates into a signal carrying intelligence corresponding to the position of a point or points having such coordinates and adapted to energize cathode ray tube means for visibly indicating relative positioning of said point or points corresponding to the spatial coordinates and arranged for use in an aircraft blind landing system whereby the coordinates of selected locations around a landing strip from the attitude and position of an approaching aircraft may be visibly reproduced for observation by the pilot and used as a guide in landing the aircraft.

Other and allied objects will become apparent to those skilled in the art from a careful examination, study and perusal of the illustrations, specification and appended claims. To facilitate understanding, reference will be had to the following drawings, in which:

Fig. 1 is a block diagrammatic drawing illustrating one specific embodiment of the present invention as employed in an aircraft blind landing system of the type more specifically described, illustrated, and claimed in the above mentioned copending application of William W. Brockway and Douglas G. Shearer, Serial No. 150,681, filed concurrently herewith.

Fig. 4 is a block diagram showing cathode ray tube means and control means therefor for translating the output signals produced by the apparatus of Fig. 1 into a visually observable indication, referred to two coordinates, of the phase displacements of two electrical input signals from a reference input signal.

Fig. 5 is an electrical schematic diagram of the apparatus of Fig. 4.

Figure 1:
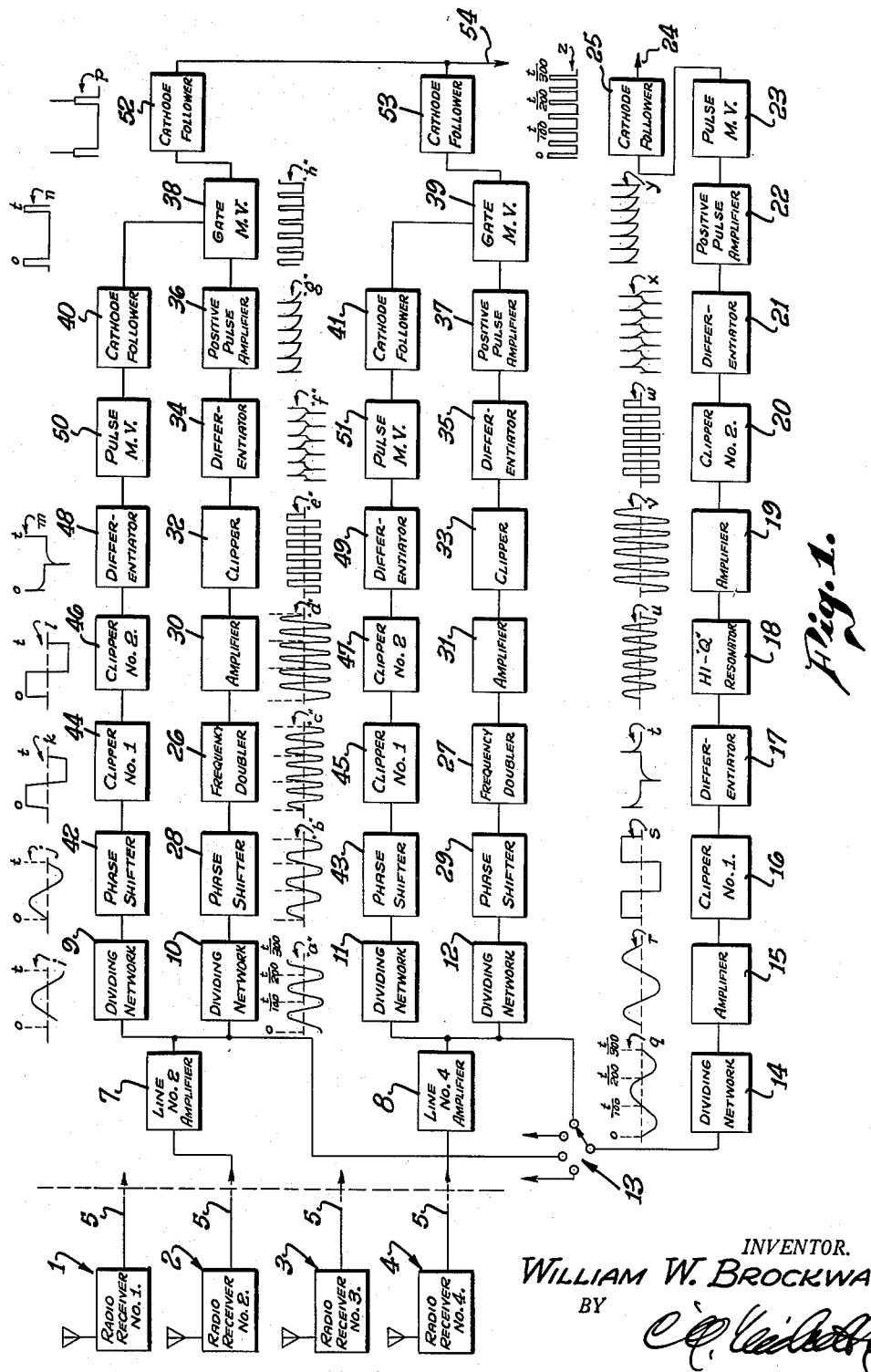

The apparatus of the present invention, as employed in a blind landing system of the type specifically described, illustrated, and claimed in said copending application, arranged to present a visual picture of a landing field or other area as seen from the radiating source (aircraft), includes a number of spaced radio receivers, indicated at 1, 2, 3, and 4 (Fig. 1) which are adapted to be positioned along the outline of the landing area or at other predetermined points, the waves received by such receivers being automatically correlated by the apparatus of the present invention to establish the position of the aircraft in space for return transmission of a video signal to the aircraft.

Each beacon receiver is arranged to receive a modulated wave of the type hereinbefore described generally and more specifically described in said copending application, which is transmitted from an approaching aircraft and detects or demodulates the received carrier wave. The demodulated components comprise a complex wave of mixed frequencies which, in the specific embodiment herein described, is composed of a 1500 cycle reference or synchronizing signal, a 3000 cycle phased signal and a 30 cycle phased signal. This detected mixed signal from each one of the beacon receivers is sent by individual conductors 5 (Fig. 1) to a central control station or correlating means which may desirably be located near the landing area and where a comparison is in effect made of the phases of the 3000 and 30 cycle signals and correlation thereof takes place. To attain this, the 3000 cycle and 30 cycle components of the detected signals are separated from the complex demodulated waves of each receiver, and the 1500 cycle reference or synchronizing signal is picked off of one of the receivers. Standard dividing network practice is employed to separate the detected frequencies.

For illustrative purposes and for simplicity only, two of the transmission lines 5 are shown connected to their respective line amplifiers 7 and 8. These line amplifiers are of conventional design and capable of amplifying all three frequencies, namely, 30 cycles, 1500 cycles and 3000 cycles. The outputs of these amplifiers 7 and 8, as well as the output of the other line amplifiers, are connected to individual dividing networks 9, 10, 11, 12. The output voltages of these individual amplifiers are also connected to individual stationary contacts of a selector switch 13, whereby the detected signals from any one of the beacon receivers 1, 2, 3, 4, etc. may be selected and connected to a reference or synchronizing signal dividing network 14.

The beacon receivers 1, 2, 3, 4, etc. may be of conventional design, either of the tuned radio frequency type or of the superheterodyne type and may operate to receive the carrier frequency of, for example, 600 kilocycles transmitted from the aircraft. These beacon receivers need not necessarily be very sensitive, inasmuch as the range of operation is ordinarily five to ten miles.

*Phase comparison principles*

The phase of two sine waves of equal or harmonically related frequencies may be compared by observing electronically corresponding points on different waves and then measuring the displacement between such points. A phase comparison may be made by comparing the displacement either between peaks or between nodes of two different sine waves. Preferably, the nodes (zero points) of the waves are used as reference points since they are more easily determined electronically. The node point of a sine wave may be determined by amplifying the wave sufficiently and then clipping off the peaks of the waves, thereby producing a square wave with very steep sides, and then differentiating the resulting square wave to produce positive and negative pulse markers. The spacing between any two marker pulses serves as a measurement of the phase displacement of the two waves. This method of phase comparison is, in effect, used in the present arrangement.

*Synchronizing or reference pulses*

As previously explained, a synchronizing standard reference signal of 1500 cycles is radiated because of phase shift introduced by transit time, i. e., the time required for a wave to travel between the aircraft and the landing area in relationship to the frequency or period of the modulating components. In general, the phase of the 3000 cycle modulating component signal is compared with the 1500 cycle standard reference signal at the central control station by multiplying the two frequencies in different amounts to obtain a common comparison frequency of 6000 cycles, producing approximately .8 microsecond pulses at the nodes of the differentiated sine waves and comparing the pulse positions.

In Fig. 1 the complex detected signal comprising components of 30 cycles, 3000 cycles and 1500 cycles from one of the illustrated line amplifiers 7, 8 is applied through the selector switch 13 to the input circuit of the dividing network 14 wherein the 1500 cycle component is selected and the other components eliminated by means of the separating or dividing network 14. The output voltage of network 14 is amplified in amplifier 15 to produce a 1500 cycle sine wave illustrated at $r$. This amplified voltage is further amplified and clipped in clipper 16 to produce a square wave illustrated at $s$. This resulting square wave is differentiated in differentiator 17 to produce equally spaced alternate polarity pulses illustrated at $t$. These pulses shock excite a high Q 6000 cycle resonant circuit 18 to produce in its output circuit a 6000 cycle sine wave illustrated at $u$ having very little amplitude variation when the resonant circuit has a high Q. This 6000 cycle signal is interlocked, of course, with the original 1500 cycle standard reference or synchronizing signal. The 6000 cycle signal is further amplified in amplifier 19 to produce the wave illustrated at $v$. This amplified wave is amplified and clipped in clipper 20 to produce the square wave, illustrated at $w$. The square output wave from the clipper 20 is differentiated in differentiator 21 to form alternate positive and negative pulses spaced at intervals of $\frac{1}{12,000}$ of a second, as illustrated at $x$. The negative pulses of this differentiated wave are then selected, inverted and amplified by means of a zero-biased amplifier 22 to produce the wave, illustrated at $y$.

It is noted that the output of this amplifier 22 contains a series of positive pulses spaced at intervals of $\frac{1}{6,000}$ of a second. This resulting series of positive pulses is shaped into approximately .8 microsecond rectangular pulses by triggering a "one-shot" multivibrator 23. The resulting .8 microsecond rectangular pulses, illustrated at $z$ (which are referred to herein as synchronizing pulses) may be applied to a low impedance transmitter keying circuit represented by the terminal 24 through a cathode coupled circuit 25. The amplitude of the pulse at terminal 24 is adjusted to such a value whereby it may key an ultrahigh-frequency transmitter for one hundred percent power output, as is described later.

Thus, a series of synchronizing standard reference pulses .8 microsecond wide occurring at regular intervals at a rate of 6000 per second are interlocked to the 1500 cycle standard reference frequency, and they provide a time base with respect to which other time shifts or phase shifts may be compared.

*Beacon receiver position indicating pulses*

It is noted that for every complete cycle of a sine wave the wave goes through a node twice, i. e., two marker pulses, one positive and one negative, may be created for each cycle. Both of these marker pulses may be used in the phase comparison and correlation system, providing the phase shifts to be compared are not greater than 180°. In the aircraft blind landing system referred to herein, only a 90° segment of the phased radiation pattern in space is scanned so that in this instance the phase of the 3000 cycle modulating signal may be observed twice for each wave thereof. Thus 6000 marker points per second may be obtained from the 3000 cycle horizontal phase-scanning frequency.

The reason for employing a 3000 cycle space-scanning frequency that is equal to one-half the 6000 cycle synchronized horizontal sweep frequency for a 200-line picture of the type described above is now apparent. In order to have all of the marker points resulting from nodes of the sine wave in a positive direction, the 3000 cycle scan frequency appearing at the output of the line amplifiers 7, 8 is doubled in corresponding frequency doublers 26, 27 after passing through corresponding dividing or separating networks 10, 12 and phase shifter circuits 28, 29. The output of the doubler circuits 26, 27 is amplified in amplifiers 30, 31, then clipped in clippers 32, 33 and differentiated in differentiators 34, 35. The positive pulses of the wave appearing at the output of the differentiators 34, 35 are eliminated by the zero-biased amplifiers 36, 37, wherein, at the same time, the negative pulses are amplified and inverted by the action of this amplifier.

The output of these amplifiers 36, 37 is applied to the .8 microsecond gate multivibrators 38, 39. It should be noted that the phase shifters 28, 29 may be adjustable to provide for correcting for the phase shift introduced by circuit conditions and to cause alteration of the pattern ultimately received and viewed on the aircraft.

Thus, a 3000 cycle sine wave appearing at the output of, for example, the line amplifier 7 undergoes a series of transformations, as illustrated at $a$, $b$, $c$, $d$, $e$, $f$, $g$ and, as will be described in detail later, causes a series of pulses $h$ to be formed in the multivibrator 38. In other words, a 3,000 cycle sine wave is illustrated at $a$ corresponding to the condition of the wave appearing at the output of the network 10. The wave is shifted in phase, as illustrated at $b$, its frequency then doubled, as illustrated at $c$. The wave is amplified, as illustrated at $d$, and subsequently clipped, as illustraetd at $e$. The wave is then differentiated, as illustrated at $f$, the positive pulses are selected, as illustrated in $g$, and this resulting wave $g$ is utilized to cause the production of pulses $h$ in the multivibrator 38.

The positive pulse $g$ at the output of the amplifiers 36, 37 triggers "one-shot" multivibrators 38, 39 to produce .8 microsecond pulses of rectangular shape, as illustrated at $h$. These pulses $h$ occur 6000 times a second, provided the corresponding multivibrator 38, 39 is not biased to an inoperative condition by a biasing signal received from the output of the corresponding cathode follower 40, 41 whose purpose is described in more detail later.

Suffice it to say for the present that the received 30 cycle per second signal is used to control the operativeness of the corresponding multivibrator 38, 39. These pulses, illustrated at $h$, of course, are synchronized with the received 3000 cycle per second signal so that in the event that the phase of the 300 cycle per second signal shifts, the series of pulses, illustrated at $h$, likewise shifts. Since the phase of a particular received 3000 cycle signal is dependent upon the position of the associated beacon receiver in space (or of the value of any other selected variable), it is apparent that the position of the series of pulses, illustrated at $h$, likewise is dependent on the position of the associated beacon receiver in space (or of the value of said variable).

These pulses are thus shifted along the time axis relative to the synchronizing or reference pulses, illustrated at $z$, within a $\frac{1}{12,000}$ second interval (which corresponds to a phase shift of 90°) depending upon the location of the associated beacon receiver in azimuth. A 90° phase shift of a 3000 cycle signal represents a time shift of $\frac{1}{12,000}$ of a second in pulse position along the time axis. This shift in pulse position along the time axis when compared with the fixed phase position of the 1500 cycle synchronizing signal transformed into the wave, illustrated at $z$ carries intelligence to determine the position of the associated beacon receiver in azimuth. In other words, the relative positions of the waves illustrated at $z$ and $h$ serve as an indication of the position of the associated beacon receiver in space.

*Means for producing receiver position intelligence-carrying signal (correlating means including electronic gating means)*

The multivibrators 38, 39 are each controlled in accordance with the received 30 cycle signals. In Fig. 1 the 30 cycle signal appearing at the output of the corresponding line amplifier 7, 8 is applied to the filter networks 9, 11 which serve to segregate the 30 cycle signal from the 1500 cycle signal and also from the 3000 cycle signal.

The output voltage of the networks 9, 11 is essentially a sine wave, as is illustrated at $i$. This sine wave voltage may have its phase shifted in the corresponding phase shifter 42, 43 which may be manually adjustable to provide compensation for phase changes in the network or for purposes of establishing a predetermined pattern on the cathode-ray tube in the aircraft to which intelligence is to be transmitted, as described later.

The output voltage of the phase shifters 42, 43 is applied to the clippers 44, 45 in which the wave is amplified and clipped to produce a square type of wave illustrated at $k$. A second clipper 46, 47 may be interposed after the first corresponding clipper 44, 45 to produce a more rectangular type of wave as illustrated at $l$. The resulting square wave is applied to corresponding differentiators 48, 49 to produce the wave illustrated at $m$.

The pulse illustrated at $m$ serves to trigger a "one-shot" gate multivibrator 50, 51 to produce a 167 microsecond rectangular pulse every $\frac{1}{30}$ of a second, as illustrated at $n$. This may be termed a gating pulse. These 167 microsecond rectangular pulses are isolated from the corresponding gate multivibrators 50, 51 by means of the cathode coupled amplifiers or cathode followers 40, 41. These 167 microsecond rectangular pulses from the cathode followers 40, 41 provide the necessary positive bias for each of the .8 microsecond multivibrators 38, 39 to condition them for operation by positive pulses of the type illustrated at $g$ from the amplifiers 36, 37.

In other words, each of the multivibrators 38, 39 is operative only during the time one of the pulses represented at $n$ is applied thereto and when one of the positive pulses illustrated at $g$ occurs simultaneously. Thus, in order to produce a pulse of the type illustrated at $h$ it is necessary that a pulse of the type illustrated at $n$ and a pulse of the type illustrated at $g$ exist concurrently to effect operation of the multivibrators 38, 39.

The biasing 167 microsecond pulse from each of the cathode followers 40, 41 allows the corresponding .8 microsecond multivibrator 38, 39 to select only one pulse every $\frac{1}{30}$ of a second. The particular 167 microsecond pulse which is selected during any one thirtieth second interval depends upon the particular phase of the 30 cycle wave illustrated at $j$, with which the pulses illustrated at $n$ are in synchronism.

It is apparent that the time during this 167 microsecond interval in which an .8 microsecond pulse occurs depends upon the phase of the 3000 cycle sine wave illustrated at $b$. In other words, a series of pulses occurs in which each pulse having a duration of .8 microsecond is spaced one thirtieth of a second from the succeeding or preceding pulse. The spacing between each such series of these recurring pulses depends upon the position of the airport ground beacon receivers within the 90° segment into which the original radio frequency carrier was radiated from the aircraft. The position of the controlled pulses (represented by $h$) within the period of gating, corresponds to an angular coordinate of the receiver.

The selected pulses, as delivered from all of the .8 microsecond multivibrators 38, 39, etc. associated with their respective beacon receivers may be coupled through cathode follower circuits 52, 53 to a common low impedance, ultrahigh-frequency keying circuit arranged to be connected to keying circuit 54.

A series of .8 microsecond pulses spaced at intervals of 1/30 of a second appears for each beacon receiver. Each of these groups of pulses are spaced relative to each other, depending upon the relative position of the associated beacon receivers in space. The keying circuit 54 is adjusted to key the ultrahigh-frequency transmitter to seventy-five percent of its power output. This adjustment is desirable in order to distinguish from the one-hundred percent power synchronizing pulses appearing at terminal 24. In other words, the positioning or coordinate pulses in circuit 54 are distinguished from the synchronizing or reference pluses at terminal 24 by amplitude difference.

Because of this difference in amplitude the pulses may be easily separated by well-known amplitude separation methods when received in the approaching aircraft. It is understood that other forms of separating techniques may be used, but for simplicity, this amplitude method is preferred.

It should be noted that a 1/12,000 second space interval ahead of each synchronizing or reference pulse in the intelligence-carrying signal in the keying circut 54 is not utilized for position pulse information. This intervening space may be used for other purposes. For example, another .8 microsecond pulse may be added or inserted into the ultrahigh-frequency transmission system on the ground, and the position of this added pulse may be shifted relative to the synchronizing pulse by means of well-known pulse shift modulation methods to produce a voice communication means. Thus, one-way voice communication may then be established over the same ultrahigh-frequency transmission channel which is locked to the 6000 pulse per second synchronizing signal.

*Pulse-generating, gating and correlating means*

Figure 2:
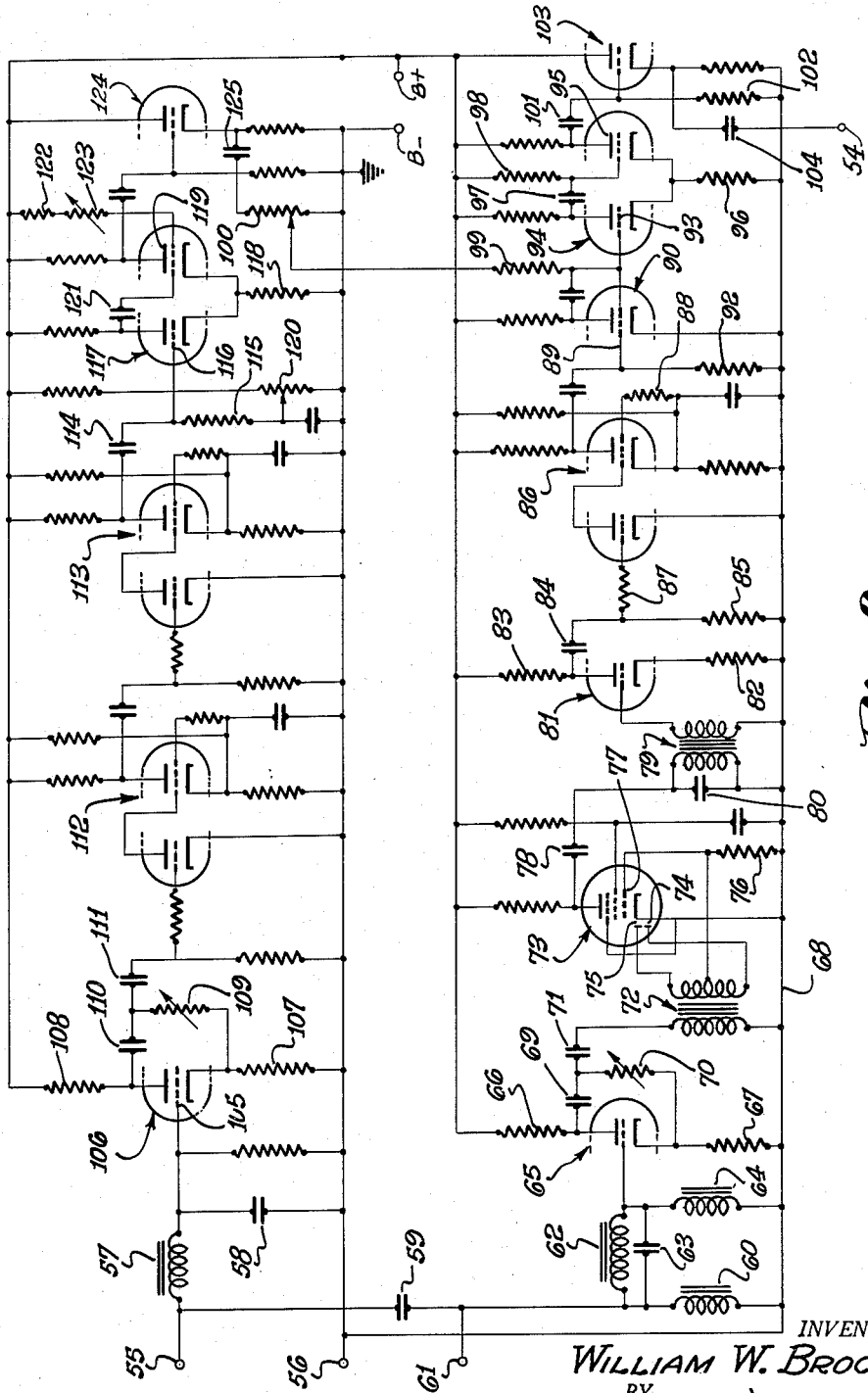
Fig. 2 is an electrical schematic drawing of the upper channel of the system which is shown in Fig. 1 as connected to radio receiver No. 2 and line amplifier No. 2, it being understood that the other channels connected to the rest of the radio receivers are similar and will not be shown specifically in order to avoid duplication.
Figure 3:
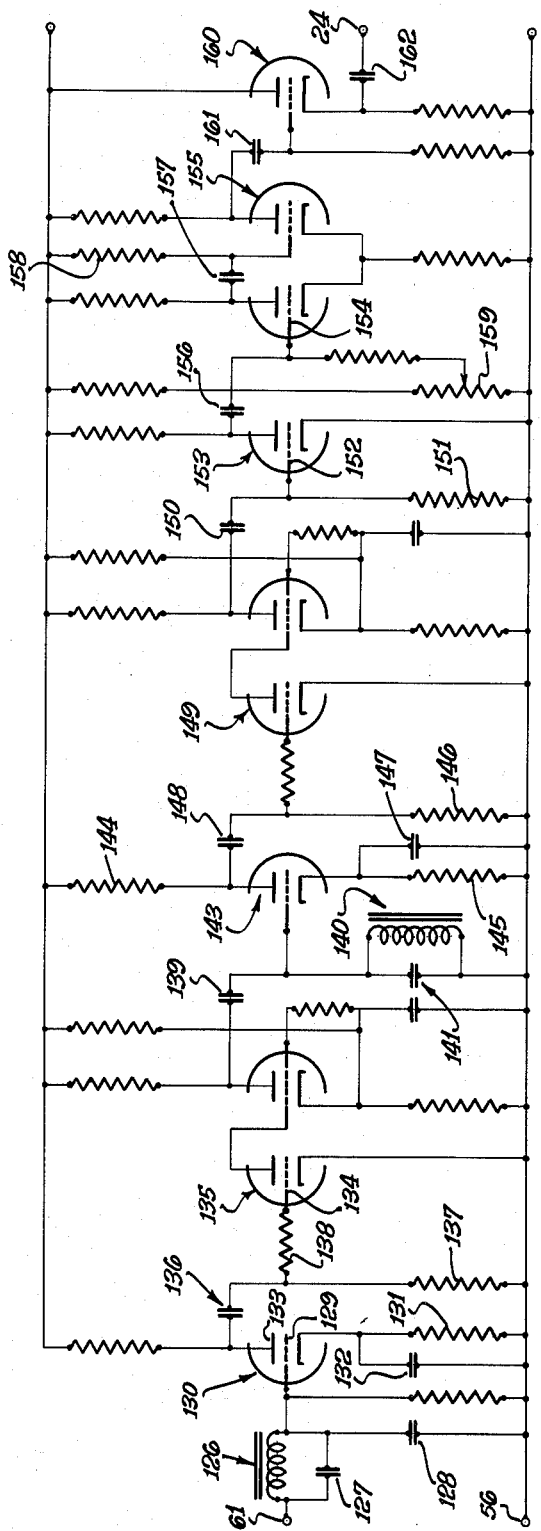
Fig. 3 is an electrical schematic drawing of the bottom channel as shown in Fig. 1, which is the reference signal channel.

Electronic circuits arranged to produce the desired pulse positions from the detected frequencies of 30 cycles, 1500 cycles and 3000 cycles are shown in detail in Figs. 2 and 3. These figures shown one form of pulse-creating, correlating and keying equipment utilized in correlating the Hertzian wave components received by a receiver and adapted to produce pulses of relatively low frequency and long duration positioned in accordance with angular phase modulation of one of the separable Hertzian wave components received by a given receiver, and adapted to produce relatively high-frequency, short duration pulses positioned in accordance with phase modulation of the other of the separable Hertzian wave components received by a given radio receiver, and including electronic gating means for selecting certain of the high-frequency pulses under the control of the low-frequency gating pulses for producing a signal carrying intelligence corresponding to the anglar coordinates of a given radio receiver. Fig. 2 shows the 30 cycle and 3000 cycle channels of Fig. 1 in greater detail.

The complex detected signal comprising 30 cycle, 1500 cycle and 3000 cycle components from the output circuit of the amplifier 7 in Fig. 1 is applied to terminals 55 and 56 in Fig. 2. The series inductance 57 and shunt capacity 58 serve as a filter arranged to pass the 30 cycle component of the detected complex wave and to attenuate the higher frequencies. The series capacity 59 and shunt inductance 60 serve as a filter arranged to attenuate the 30 cycle component of the detected complex wave and to pass the 1500 cycle and 3000 cycle components so that these two frequency components appear across the terminals 56 and 61. Terminals 56 and 61 of Fig. 2 correspond to the same numbered terminals of the synchronizing reference pulse circuit illustrated in Fig. 3.

In Fig. 2 the 1500 and 3000 cycle signal is fed through the parallel resonant circut comprising inductance 62 and capacity 63, which circuit is tuned to 1500 cycles, thereby offering maximum series impedance to that frequency. The shunt inductance 64 offers further attenuation to the 1500 cycle component. Thus, substantially, only the 3000 cycle component appears on the control grid of tube 65 which serves as a phase-shifting circuit corresponding to the phase shifter 28 in Fig. 1. The plate resistor 66 and cathode resistor 67 of tube 65 are of equal value. The 3000 cycle signal appearing between the cathode of tube 65 and lead 68, which may be grounded, is in phase with the voltage applied to the control grid of tube 65 while the signal appearing at the plate terminal is substantially 180° out of phase with the signal applied to the grid. The capacity 69 and variable resistance 70 serve as a means for shifting the phase of the 3000 cycle signal applied to the capacity 71 and to the primary winding of transformer 72. With the variable resistance 70 adjusted to zero resistance, the resulting in phase signal across resistance 67 is coupled directly to the following circuits. When the resistance 70 is adjusted to its maximum value, which may be infinity, the resulting 180° out-of-phase signal is applied to the same following circuits. It is thus apparent that the variable resistance 70 may be adjusted to any intermediate value so as to provide any degree of phase shift between zero and 180°. The required phase shift to compensate for circuit delays may be introduced at this place if desired.

The duplex diode pentode vacuum tube 73 is used as a frequency doubler and amplifier and corresponds to the corresponding units 26, 30 in Fig. 1. The signal from the center tapped secondary of the transformer 72 is full-wave rectified through action of the two diodes 74, 75 of tube 73. The full-wave rectified voltage appears across the resistor 76 and is applied directly to the grid 77 of the pentode section of the tube. The amplified full-wave rectified signal is coupled through the condenser 78 to a 6000 cycle tuned resonant primary winding of a transformer 79. The capacity 80 resonates said primary winding. The 6000 cycle sine wave is further amplified by the amplifier circuit comprising the triode vacuum tube 81, cathode resistor 82, plate resistor 83, coupling condenser 84, and grid resistor 85. The amplified 6000 cycle sine wave is clipped by action of the direct current amplifier circuit which includes a dual section high-gain vacuum tube 86 with almost zero bias upon the grids of the tubes. The peaks of the 6000 cycle sine wave are symmetrically clipped in the grid circuits 87 and 88 of tube 86.

The clipped sine wave output of the clipper tube 86 (corresponding to the clipper 32 shown in Fig. 1) is essentially a square wave, as illustrated at e in Fig. 1. This square wave signal is coupled to the grid 89 of a positive pulse amplifier 90. The coupling circuit includes a small condenser 91 and resistor 92 with a circuit time constant of .1 microsecond. The differentiated pulses obtained from this coupling circuit are applied to the grid 89 of the zero-biased amplifier 90. The negative pulses are transformed and cause the production of amplified positive pulses at the plate of the tube 90. These positive pulses are coupled to the grid 93 of the "one-shot" multivibrator circuit 94.

This "one-shot" multivibrator circuit including tube 94 corresponds to the multivibrator 38 shown in Fig. 1 and is normally in an inoperative condition with the flow of current to the plate 95 biasing the grid 93 to a negative or "off" condition, due to the voltage drop in the common cathode resistor 96. The multivibrator is tuned by means of the coupling capacity 97 and grid resistor 98 to produce approximately .8 microsecond pulses. The positive pulses delivered to the grid 93 of the one-shot multivibrator are normally not of sufficiently great amplitude to overcome the normal bias voltage on the grid 93, an additional positive voltage being necessary to trigger the multivibrator circuit.

This additional positive voltage for triggering the circuit is supplied to the grid 93 through resistor 99 from the voltage divider 100. The one-shot multivibrator circuit including tube 94 is therefore inoperative unless the proper bias voltage is supplied to the tube 94 at the same time and concurrently with any one of the 6000 per second reoccurring positive pulses which are applied to the grid 93 of the tube. The voltage across the variable resistor 100 thus serves as a gating voltage for the multivibrator circuit including tube 94. The .8 microsecond pulses produced by the one-shot multivibrator are coupled by means of the coupling capacity 101 and grid resistance 102 to a cathode follower amplifier 103 corresponding to the cathode follower 52 in Fig. 1. The low impedance characteristics of the cathode coupled amplifier are ideal for pulse coupling circuits using low impedance transmission lines. The output from the cathode follower amplifier 103 is coupled through capacity 104 to the ultrahigh-frequency transmitter keying circuit 54.

The .8 microsecond pulses are the "positioning pulses" and function to modulate an ultrahigh-frequency transmitter to seventy-five percent power as compared to the one-hundred percent power keying produced by the synchronizing or reference pulses.

The gate bias voltage produced across the variable resistor 100 is dependent upon the 30 cycle vertical coordinate scanning frequency applied to the grid 105 of the phase shifting circuit using the tube 106 (which corresponds to 42 in Fig. 1). The resistors 107, 108, and 109 and condensers 110 and 111 have the same function as similar units in the 3000 cycle phase shifter circuit 65 which is described above. The peaks of the 30 cycle sine wave are clipped twice by the action of the two cascade direct coupled amplifiers employing the dual high gain triode vacuum tubes 112 and 113. These clipper amplifiers operate in the same manner as the previously described amplifier 86. It is desirable to employ two instead of one clipper amplifier in order to produce a steep-sided square wave to produce, in turn, short trigger pulses of 20 microsecond duration or less. The condenser 114 and resistor 115 have small electrical values in order to produce differentiating pulses of less than 20 microseconds upon the grid 116 of a 167 microsecond gate one-shot multivibrator 117 which corresponds to the multivibrator 50 in Fig. 1.

The grid 116 is normally biased to an inoperative condition by the voltage drop across the common cathode resistor 118 produced by the space current flowing to the plate 119. The grid 116 is supplied with an added positive voltage from the voltage divider 120, through the grid resistor 115. The negative grid voltage applied to the grid 116 is adjusted by means of the voltage divider 120 to a condition wherein a small positive pulse across the resistor 115 triggers the one-shot gate multivibrator circuit including tube 117 to produce a rectangular pulse of the type illustrated at $n$ in Fig. 1. The duration of this rectangular pulse is determined by the time constant of the circuit comprising the coupling capacity 121, resistor 122 and variable resistor 123. This time constant is adjusted to be approximately 167 microseconds in duration. One such pulse will thus occur every 1/30 of a second. Each of the pulse-producing means includes clipper means for clipping the separable components, differentiating means for producing sharply peaked pulses at the nodes of the clipped waves, and multivibrator means for producing virtually flat-topped pulses of the proper frequency and period.

The gate multivibrator including tube 117 is isolated from the .8 microsecond multivibrator 94 and vice versa by means of the cathode follower amplifier circuit including tube 124 (which corresponds to 40 in Fig. 1). The 167 microsecond pulse is coupled to the variable gate voltage divider 100 by means of the coupling capacity 125.

It is thus apparent that the 167 microsecond pulse occurring every 1/30 of a second biases the .8 microsecond multivibrator including tube 94 to a condition for such a period of time that a concurrent one of the 6000 per second reoccurring pulses produced by the 3000 cycle horizontal coordinate scanning frequency causes such multivibrator circuit tube to be triggered. The particular one of the 200 reoccurring pulses (6000 divided by 30) which will cause the multivibrator to be tripped depends upon the phase of the 30 cycle signal applied to the terminals 55, 56 in Fig. 2. Also, the particular time during the 167 microsecond interval at which the multivibrator circuit including tube 94 is tripped depends upon the phase of the 3000 cycle signal applied to the same terminals 55, 56.

The position of the gating pulses corresponds to one of the angular coordinates of the receivers and the position of the controlled pulses within the period of gating pulses corresponds to the other of the angular coordinates of the receivers.

A synchronizing or reference pulse of the type illustrated at $z$ in Fig. 1 may be created by a circuit of the type shown in Fig. 3. The 1500 cycle and 3000 cycle signals applied to the terminals 61, 56 are separated by action of the parallel resonant circuit comprising inductance 126, condenser 127, and shunt capacity 128. This parallel resonant circuit is tuned to 3000 cycles and therefore is of maximum impedance at that frequency. Thus, substantially only the 1500 cycle synchronizing voltage appears on the grid 129 of the amplifier tube 130. The cathode resister 131 and bypass condenser 132 provide the proper Class A bias for the triode amplifier tube 130.

The output from the plate 133 of this amplifier tube is coupled to the grid 134 of a direct current amplifier and clipper tube 135 by means of the coupling capacity 136 and grid resistors 137, 138. The clipper circuit including clipper tube 135 corresponds to the clipper 16 in Fig. 1. The function of the clipper tube 135 is to symmetrically clip the peaks of the sine wave appearing on its grid to produce a square wave of the type illustrated at $s$ in Fig. 1. This square wave output coupled through a small capacity 139 produces differentiated pulses of alternating positive and negative polarity across the parallel resonant circuit comprising inductance 140 and shunting capacity 141. The pulse shock excites the parallel resonant circuit 140, 141 to produce a 6000 cycle sine wave signal at the grid 142 of the amplifier tube 143. This resonant circuit is tuned to 6000 cycles and has a high Q.

The 6000 cycle sine wave thus produced is amplified by the amplifier circuit including the triode amplifier tube 143, resistors 144, 145, 146 and capacities 147 and 148. This amplified sine wave is subsequently clipped by the clipper circuit including tube 149 and is differentiated by the small condenser 150 and small resistor 151 to produce .8 microsecond pulses of the type shown at $x$ in Fig. 1, at the grid 152 of the positive pulse amplifier tube 153.

The amplified positive pulses are coupled to grid 154 of a "one-shot" .8 microsecond multivibrator including tube 155 by the coupling condenser 156. The action of this one-shot multivibrator including tube 155 is identical with the corresponding one described in connection with the circuit shown in Fig. 2. The .8 microsecond pulses created by this multivibrator tube 155 are controlled by the time constant of the coupling condenser 157 and resistor 158. The bias voltage on the grid 154 is controlled by adjustment of the voltage divider 159. The .8 microsecond pulses created by this one-shot multivibrator tube 155 are, of course, synchronized with the original 1500 cycle synchronizing signal and recur at the rate of 6000 times per second. The 6000 .8 microsecond pulses per second are coupled to the cathode follower amplifier 160 by the coupling condenser 161. The low impedance output of the cathode follower 160 (which corresponds to 25 in Fig. 1) is coupled to ultrahigh-frequency transmitter keying terminal 24 through coupling capacity 162. These synchronizing pulses key the ultrahigh-frequency transmitter (hereinabove mentioned) to one-hundred per cent power output.

It is to be understood that while the system illustrated in the appended drawings and specifically described hereinabove is arranged for use in an aircraft blind landing system of the type more fully described, illustrated and claimed in the above mentioned copending application Serial No. 150,681, the apparatus of the present invention is not limited to use in such a system but has an extremely wide field of usefulness and may be employed for correlating two phase-modulated signals in a manner to produce an intelligence-carrying signal capable of luminescent transformation into an illuminated spot (or plurality of spots) positioned with respect to a frame of reference so as to have two coordinates (or more, in the case of a plurality of spots) with respect to said frame of reference equal in value to or corresponding to the two variables provided that the above-mentioned phase-modulated or phase-displaced signals are each phase-displaced in accordance with a different one of said variables. In systems of this character, the radio receivers 1, 2, 3, and 4 shown in Fig. 1 will, of course, be dispensed with. The dividing networks 9, 10, 11, 12 and 14 may also be dispensed with and in certain cases the line amplifiers 7 and 8, etc. may also be dispensed with and, of course, the return high-frequency transmitter (not shown) which the keying circuit 54 is arranged to control may be dispensed with and the output of the system may be coupled to a cathode-ray tube for forming an image.

Cathode ray tubes and control means therefor adapted to be coupled to the output of the system thus far described are shown in Figs. 4 and 5. The synchronizing pulses produced at 24 (Figs. 1 and 3) are represented at 174 and are applied to the one-shot multivibrator or blocking oscillator circuit 173, which functions to trigger the following six thousand cycle horizontal sweep generator 175. The pulses applied to this generator 175 are illustrated at 176. The output wave of the generator 175 is illustrated at 177. This saw tooth type of wave illustrated at 177 is applied alike to the input circuits of the horizontal amplifiers 178 and 179, whose output is coupled respectively to the cathode ray tubes 180, 181. Specifically, the outputs of these amplifiers 178, 179 are connected to the horizontal deflecting plates of the corresponding cathode ray tubes 180, 181.

The associated vertical deflecting plates of these two cathode ray tubes 180, 181 are supplied with 30 cycle sweep signals generated in synchronism with the 6000 cycle horizontal sweep signals. It may be desirable, in order to prevent drifting, to provide conventional interlocking means 183 between the 6000 cycle circuit and the 30 cycle circuit. A 30 cycle synchronous pulse multivibrator 186 supplies at its output terminals a rectangular type of wave illustrated at 187. Such rectangular type wave is applied to the input circuit of the vertical sweep generator or oscillator 188 to trigger the sweep oscillator circuit 188 in such a manner as to produce a saw tooth wave of the type illustrated at 190 at the output terminals of the generator 188. This saw tooth wave 190 is applied to the input terminals of the two vertical sweep amplifiers 191, 192 whose output terminals are connected respectively to the vertical deflection plates of the cathode ray tubes 180, 181, respectively.

Thus, the deflecting plates of the cathode ray tubes 180, 181 are supplied with sweep voltages from different sources which are synchronized. It is apparent that by proper adjustment of the cathode ray beam, centering controls, and amplifier gain, the two cathode ray tubes may produce identical images.

The position pulses (75% power pulses) produced at 54 (Figs. 1 and 2) are illustrated at 194 and are applied to the input circuit of the position pulse amplifier 195 wherein the pulses are amplified and applied to the tubes 180, 181 in like amounts to control the intensity of the cathode ray beams in such tubes to thereby control the brightness of the luminescent spot where the cathode ray beam impinges the screen.

The cathode ray beams of both cathode ray tubes are normally biased "off" to a condition that allows the 75% positive power position pulses to turn the cathode beam "on" and thus produce an instantaneous bright spot upon the screen. The brightness of the spot, of course, depends upon the amplitude of the position pulses. When the system is used for ground monitoring in a blind landing system, the amplitude of these position pulses may be controlled on the ground to aid in creating the illustion of depth. The direction of approach of the aircraft with respect to the landing area whose outline is defined by the fixed beacon receivers may be considered to be a predetermined direction of flight and any deviation from such predetermined direction of flight, by proper adjustment of the control equipment on the ground, may be observed on the ground monitoring screen or screens, as spots which are brighter than normal upon the face of the cathode ray tube screen. In other words, the desired direction of approach of an aircraft with respect to the landing area may be predetermined, in which case it is possible to regulate the position pulse amplitudes in such a manner that the approach beacon positions appear as brighter spots upon the face of the cathode ray tube screen when the actual flight path of the aircraft deviates from the desired direction of approach.

Fig. 5 shows in more detail some of the apparatus illustrated in block diagram in Fig. 4. In Fig. 5 tubes 203, 208, 222 and 223 control the 30 cycle vertical sweep signal, while tubes 245, 251, 228 and 229 control the 6000 cycle horizontal sweep signal. The signal appearing at 24 is applied to the 6000 cycle portion of the circuit, and desirably the pulses appearing at the grid of tube 251 are coupled through lead 183 and capacitor 184 to the input terminal 200 of the 30 cycle portion of the circuit in order to prevent any possibility of drifting of the latter in frequency. Thirty cycle pulses from a suitable source (not shown) are supplied to terminals 200, 201. These pulses appear on the grid 202 of the dual vacuum tube 203, which operates as a one-shot multivibrator with the time width of the pulses adjusted to 0.0167 second by adjustment of the grid register 204 and coupling condenser 205. The plate 206 of tube 203 is normally supplied with space current to produce a negative bias upon grid 202 due to the voltage drop across the cathode resistor 211. The variable resistor 208A is adjusted to supply positive bias to the grid 202 to balance out a portion of the negative bias. The sensitivity of the one-shot multivibrator including tube 203 is adjusted by this bias balance control. Each 30 cycle pulse applied to the grid 202 triggers the multivibrator to produce positive pulses of the type illustrated at 187 in Fig. 4 at the plate 206.

These positive pulses at plate 206 are utilized to minimize or reduce to zero the normal negative bias applied to the grid 207 of the sweep generator tube 208. Negative bias for tube 208 is obtained from voltage divider 209 and supplied to the grid 207 through grid resistor 210. This sweep generator tube 208 is normally biased to "cut-off." The condenser 212, when the tube 208 is non-conducting, is gradually charged through the plate resistor 213. A positive pulse applied to the grid 207 causes the bias voltage on tube 208 to be minimized or reduced to zero to cause the previously charged condenser 212 to discharge rapidly through the tube 208. A saw tooth output signal of the type illustrated at 190 in Fig. 4 thus appears at the plate 214 of the sweep generator tube 208.

This saw tooth wave at plate 214 is coupled through the condenser 215 to two variable resistors 216 and 217 which are adjustable to control individually the amplitude of the signal applied to the grids 220, 221 of the two 30 cycle sweep amplifier tubes 222, 223 respectively. A portion of the amplified output signal appearing on the corresponding plates 224, 225 is coupled to the grids 226, 227 of the second section of these corresponding tubes. The phase and magnitude of such signals applied on the one hand from anode 224 to grid 226 and on the other hand from anode 225 to grid 227 may be adjusted by adjustment of the corresponding resistors 230, 232, and resistors 231, 233 respectively. A push-pull type of sweep signal may thereby be produced across the two anodes 224, 225 of the tubes 222, 223. This push-pull amplified 30 cycle sweep signal appearing across the anodes 224, 225 is applied by means of the coupling condensers 234, 235, 236 and 237 to the corresponding vertical deflecting plates 238 and 239, respectively, of the cathode ray tubes 240, 241.

The position, in the vertical direction, of the cathode ray beam of these cathode ray tubes may be controlled by the dual voltage control variable resistors 242 and 243. Positive potential on one of the vertical plates of the cathode ray tube is increased as the negative potential applied to the other cooperating plate is decreased or vice versa when these dual control resistors 242, 243 are varied. A shifting of the cathode beam in the vertical direction may thereby be accomplished. The resistors 245A, 246A, 247A, 248 couple the positioning voltages to the respective plates of the cathode ray tubes 240, 241.

In Fig. 5 the circuit immediately below the 30 cycle sweep circuit previously described, is arranged to supply 6000 cycle sweep signals to the horizontal deflecting plates of the cathode ray tube and is identical in function and operation to the 30 cycle sweep circuit with the exception that the time constant of certain circuit elements is different in the 30 and 6000 cycle circuits. The 6000 cycle sweep circuit including tube 245 is adjusted to produce rectangular pulses of .001 second duration of the type illustrated at 176 in Fig. 4 by adjustment of the time constant of the circuit including resistor 246 and condenser 247. The sweep voltage produced at the plate 250 of the sweep amplifier 251 thus recurs every .002 second and sweeps for .001 second. This sweep voltage is applied to the variable resistors 252, 253 to control the horizontal sweep width on the cathode ray tubes 240, 241. The horizontal amplifiers including tubes 228, 229 are identical to the corresponding vertical amplifier circuits including tubes 222 and 223 and need not be further explained.

Also, the horizontal beam-centering controls 244, 249 have the identical function as the vertical beam centering controls 242, 243 and need no further explanation.

The positioning pulses from a standard pulse amplifier represented at 195 in Fig. 4 are applied between terminals 201 and 258. These positioning pulses are applied to the intensity control grids 260, 261, respectively, of tubes 240, 241 through the coupling condenser 262, and the corresponding series current-limiting resistor 263, 264. Negative bias voltage for the grids 260, 261 is obtained from the voltage divider 266. This negative bias voltage is applied to the grids through the grid resistor 266A.

A high voltage power supply of approximately 1800 volts, preferably of the radio frequency type, provides all the necessary voltages for the cathode ray tubes. The positive terminal of the 1800-volt source is connected to the grounded directors 266B, 267B, while the negative terminal of such 1800-volt source is connected to terminal 270. The voltage divider comprising resistors 271, 272 and 265, 266, 277 are connected between ground and terminal 270. The cathodes 268 and 269 of the cathode ray tubes are connected together and to point 270A on the voltage divider circuit to render these cathodes positive with respect to the intensity control grids 260, 261. The potentials on the focusing electrodes 272A, 273 are individually controlled by the corresponding variable voltage dividers 266 and 267.

It is possible to individually control the cathode ray tube within the operational limits of this "blind" landing system by adjustment of the controls heretofore described. The beams of the cathode ray tubes 240, 241 are adjusted to produce identical images upon the face of the two tubes.

It will be understood that one cathode ray tube alone displays the desired intelligence, and that two are shown and described herein solely as one means of facilitating the natural viewing of the display, all as set forth in greater detail in copending application Serial No. 150,681. In applications of the system of the present invention wherein perspective and illusion of naturalness of viewing are not necessary, as in the pictorializing of the relationship of two variables not purporting to represent visually observable phenomena, one cathode ray tube would normally be used.

An illustration of one such application of the system is set forth in the following example. Let us assume that a constant volume chamber is filled with a perfect gas and that the temperature of the gas (and correspondingly the pressure of the gas) may be changed at will, or in other words, the temperature and the pressure are variable. This might be done by providing controllable means for heating the gas, such as an electrically energizable heating coil or the like positioned within the chamber. If the heating coil is energized and the gas is heated, the temperature of the gas will rise and the pressure thereof will correspondingly rise also. Correspondingly, if the electrical heating coil is de-energized and heat is allowed to escape by conduction through the walls of the chamber and/or radiation from the heated walls of the chamber, the temperature of the gas within the chamber will fall and the pressure of said gas will fall correspondingly. In the above-described example, the two variables (which correspond to the angular coordinates hereinbefore mentioned in the apparatus of the present invention as used in an aircraft blind landing system) are pressure and temperature, temperature in the example above described being the independent variable and pressure being the dependent variable.

In the study of thermodynamics and in thermodynamic test procedures generally, it is often desirable to employ visually observable graphs illustrating the functional relationship between pressure and temperature and/or numerous other variables such as pressure and volume, etc. Supposing it is desired to make such a graph illustrating the functional relationship between pressure and temperature of the specific example described above. This ordinarily would be a difficult procedure. The temperature of the gas in the constant volume chamber would have to be determined at various times separated by time intervals as would the pressure and points corresponding to these two coordinates would have to be manually marked upon a graph and a smooth, continuous curve manually drawn connecting these points. It would not be possible to observe the functional relationship while the variables are actually changing, since it would be necessary to wait until such chart is prepared from the measured values of the variables. Through the use of the apparatus of the present invention it is possible to produce on the luminescent screen of a cathode-ray tube a visibly observable graph of the pressure-temperature functional relationship of the example specifically mentioned hereinabove. This may be done by feeding a frequency (corresponding to the horizontal coordinate scanning frequency of 3000 cycles in the apparatus of the present invention as employed in an aircraft blind landing system as described hereinbefore) into a phase-shifting means which is arranged to phase-displace said frequency in accordance with variation in one of the variables (in the specific example mentioned above, pressure or temperature), and feeding another wave of a frequency (which may correspond to the vertical coordinate scanning frequency of 30 cycles hereinbefore mentioned in connection with the apparatus of the present invention as employed in an aircraft blind landing system as described hereinbefore) into phase-shifting means which is arranged to shift the phase of said signal in accordance with variations in the second variable (in the specific example mentioned above, pressure or temperature).

It can be seen from the foregoing description that each of the two signals is phase-displaced in accordance with a different one of the variables considered (pressure or temperature in the specific example mentioned) and thus the output signal carries intelligence which when employed to modulate a cathode-ray tube beam (which is synchronized with the original non-phase-displaced signals which are employed to generate sweep voltages applied to the deflecting plates of the cathode-ray tube) will produce a luminescent spot on the screen of the cathode-ray tube in a position having coordinates with respect to a frame of reference equal or corresponding to the instantaneous pressure and temperature values causing the phase displacement of the two signals. During variation of the variables the spot will trace a curve of the functional relationship between the variables. Various means responsive or sensitive to the variables may be employed for controlling the phase-shifting means. For example, in the specific case mentioned above, pressure-sensitive means exposed to the pressure within the constant volume chamber, such as bellows, piezo-electric means or any other suitable means, may be employed and arranged to control some electrical value in a manner to produce phase shift in the phase-shifting means. In the specific example illustrated above, the temperature-sensitive or responsive means exposed to the gas within the chamber may be of any well-known type such as thermally sensitive bridges, thermometers, and the like, arranged to control some electrical value for producing phase shift in the phase-shifting means associated therewith. The phase-shifting means may be of any well-known type such as phase-shifting networks, reactance modulators, etc., and various other systems such as are commonly employed in standard frequency or phase-modulation practice.

The present system may be employed in a great number of different specific applications and where a great number of different pairs of variables are concerned. For example, it might be employed for producing a graph of pressure and temperature in combustion chambers of various types of internal combustion engines. It might be employed for producing a graph of mass-flow rate and pressure or density of a fluid or liquid, etc. The applications of the present invention are too numerous to mention specifically and many other applications of the present invention will be apparent to those skilled in the art and are intended to be included and comprehended herein.

The examples described and illustrated herein are exemplary only and are not intended to limit the scope of the present invention, which is to be interpreted in the light of the appended claims only.

I claim:

1. In apparatus for correlating and comparing signals phase displaced from reference signals in accordance with variables and producing therefrom a visible display indicating said displacements, the combination of: a plurality of spaced radio receivers, each responsive to input signals of two harmonically related frequencies; means associated with each of said receivers for producing relatively long duration pulses in timed relation with the occurrence of a predetermined value of an input signal of the lower of said frequencies and relatively short duration pulses in timed relation with the occurrence of a predetermined value of an input signal of the higher of said frequencies and generating an output intelligence signal when said two pulses are produced simultaneously; means for generating output reference signals in timed relation with the occurrence of predetermined values of input reference signals; cathode ray tube means including means for producing an electron beam and sweep circuits for deflecting said beam in angularly related directions; means for combining said output intelligence signals into a series of signals and impressing said series upon the beam producing means; and means for effectively impressing said output reference signals upon said sweep circuits and thereby synchronizing the latter whereby the cathode ray tube means produces a visible display of said output intelligence signals positioned in accordance with their phase displacements from the output reference signals.

2. The invention as stated in claim 1 wherein the means for generating output reference signals includes a radio receiver adapted to receive input reference signals of a frequency different from said harmonically related frequencies.

3. The invention as stated in claim 1 wherein said predetermined values of input signals are null.

4. In apparatus for correlating and comparing signals phase displaced from reference signals in accordance with variables and producing therefrom a visible display indicating said displacements, the combination of: a plurality of spaced radio receivers, each responsive to input signals of two different frequencies; means associated with each of said receivers for generating an output intelligence signal when said input signals simultaneously assume predetermined values; means for generating output reference signals in timed relation with the occurrence of predetermined values of input reference signals; cathode ray tube means including means for producing an electron beam and sweep circuits for deflecting said beam in angularly related directions; means for combining said output intelligence signals and impressing said series upon the beam producing means; and means for effectively impressing said output reference signals upon said sweep circuits and thereby synchronizing the latter whereby the cathode ray tube means produces a visible display of said output intelligance signals positioned in accordance with their phase displacements from the output reference signals.

5. The invention as stated in claim 4 wherein the means for generating output reference signals includes a radio reciver adapted to receive input reference signals of a frequency different from said harmonically related frequencies and said predetermined values are null.

6. In apparatus for correlating signals received by a plurality of spaced radio receivers scanned by scanning means and for producing from said correlated signals a visible indication of the positions of said receivers relative to one another, the combination of: a radio receiver adapted to receive reference input signals and to generate reference output signals in timed relation therewith; a plurality of spacd radio receivers, each adapted to generate intelligence output signals in timed relation with reception of intelligence input signals each phase displaced from said reference input signals in accordance with variables; cathode ray tube means including means for producing an electron beam and sweep means for repetitively deflecting said beam in angularly related directions; means for controlling said sweep means in timed relation with said reference output signals; and means for combining said intelligance output signals into a series of discrete signals and impressing said series of signals upon said beam producing means whereby to produce a visible display of the relative locations of said radio receivers.

7. In a system for comparing signals phase displaced from a reference signal in accordance with variables, and correlating said signals for producing a visible display thereof, the combination of: means for generating a reference signal; a plurality of means for producing intelligence output signals phase displaced from said reference signal in accordance with variables; cathode ray tube means including means for producing an electron beam and sweep circuit means for deflecting said beam in angularly related directions; means for synchronizing said sweep circuit means in timed relation with said reference signal; and means for combining said intelligance output signals into a series and impressing same upon said beam producing means whereby to produce a visible display on said cathode ray tube means of the intelligence output signals disposed in accordance with their phase displacements from the reference signal.

8. In correlating apparatus for receiving a reference signal and a plurality of intelligence signals phase displaced from the reference signal in accordance with variables and producing a visible display of the intelligence signals disposed in accordance with said variables, the combination of: a plurality of spaced radio receivers, each including means for generating an output intelligence signal in timed relation with reception of an input intelligence signal; means for combining said output intelligence signals into a series of signals; means for generating a reference output signal at one of said receivers in timed relation with a reference input signal thereto; and cathode ray tube means operatively connected to said combining means and having sweep circuits synchronized with said reference output signals for producing a visible indication of the signals in said series as phase displaced among themselves and relative to said reference output signal.

9. In apparatus for visually indicating the positions of a plurality of points corresponding to the phase displacements of intelligence signals relative to reference signals, the combination of: means for producing a plurality of intelligence signals each phase displaced from reference signals in accordance with variables; means for producing reference output signals in response to reference input signals; cathode ray tube means provided with means for producing an electron beam and beam sweeping circuits adapted to repetitively deflect said electron beam in angularly related directions; means for combining said intelligence signals into a series of signals and impressing said series upon said beam producing means; and means for effectively impressing said reference output signals upon said beam sweeping circuits and synchronizing the latter whereby the cathode ray tube means produces a visible display of said intelligence signals positioned in accordance with their phase displacement from said reference signals.

References Cited in the file of this patent

UNITED STATES PATENTS

| | | |
|---|---|---|
| 1,406,996 | Morrill | Feb. 21, 1922 |
| 2,408,773 | Goodall | Oct. 8, 1946 |
| 2,421,017 | Deloraine | May 21, 1947 |
| 2,430,244 | O'Brien | Nov. 4, 1947 |
| 2,432,158 | Hulst et al. | Dec. 9, 1947 |
| 2,470,464 | Bowie | May 17, 1949 |
| 2,514,436 | Alvarez | July 11, 1950 |
| 2,515,464 | Minneman | July 18, 1950 |
| 2,521,697 | Deloraine et al. | Sept. 12, 1950 |
| 2,541,125 | Strong | Feb. 13, 1951 |
| 2,543,002 | Deloraine | Feb. 27, 1951 |